Figure 6A:
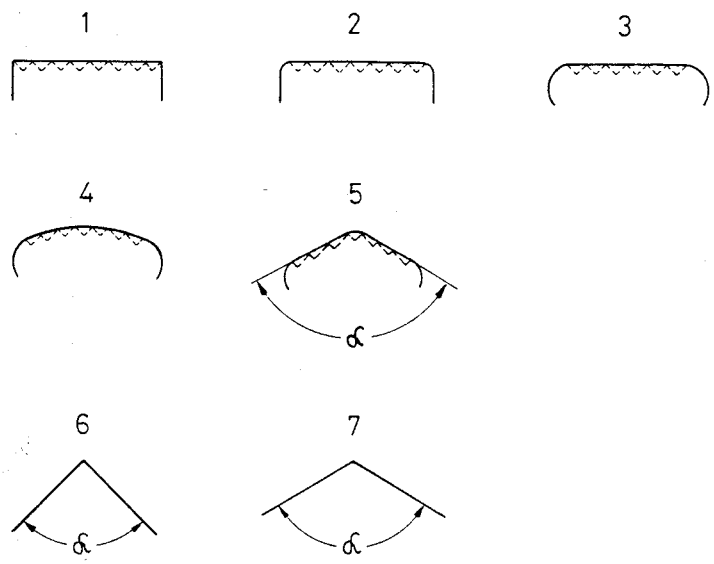

United States Patent [19]

Urech

[11] Patent Number: 4,795,875
[45] Date of Patent: Jan. 3, 1989

[54] CONTACT WIRE FOR A ROLLER SEAM WELDING MACHINE

[75] Inventor: Werner Urech, Kaiserstuhl, Switzerland

[73] Assignee: Elpatronic AG, Switzerland

[21] Appl. No.: 877,262

[22] Filed: Jun. 23, 1986

[30] Foreign Application Priority Data

Jul. 1, 1985 [CH] Switzerland ............ 2802/85

[51] Int. Cl.⁴ .................................... B23K 11/06
[52] U.S. Cl. ............................. 219/84; 219/119
[58] Field of Search ............. 219/81, 82, 83, 84, 219/119

[56] References Cited

U.S. PATENT DOCUMENTS

| | | | |
|---|---|---|---|
| 1,727,166 | 9/1929 | Frick | 219/119 X |
| 3,092,712 | 6/1963 | Peras | 219/81 |
| 3,102,945 | 9/1963 | Opprecht | 219/81 |
| 3,596,043 | 7/1971 | Sporri | 219/83 |
| 3,842,235 | 10/1974 | Opprecht | 219/83 |

FOREIGN PATENT DOCUMENTS

| | | |
|---|---|---|
| 595177 | 1/1978 | Switzerland . |
| 1124888 | 8/1968 | United Kingdom . |

Primary Examiner—E. A. Goldberg
Assistant Examiner—Teresa Walberg
Attorney, Agent, or Firm—McCormick, Paulding & Huber

[57] ABSTRACT

The contact wire (30) for a roller seam welding machine is provided on its front face with grooves (32) which are formed in the longitudinal direction of the wire and which are bounded by sharp longitudinal edges (34). The contact wire (30) is particularly well suited for welding metal sheets, the surfaces of which are heavily soiled or provided with coatings which are poor electrical conductors or electrically non-conducting. During the welding operation, the longitudinal edges (34) cut open the sheets to be welded or their oxide layer or coating which is a poor electrical conductor or non-conducting, and render possible a direct passage of the welding current to the actual metal sheet. Dirt as well as semi-plastic and vaporized coating material are reliably carried away to the front and rear in the longitudinal grooves so that the contact wire (30) cannot "float" during the welding operation. A preferred application for the contact wire (30) is the welding of fuel tanks from sheets which are coated so as to be poor electrical conductors or non-conducting on both sides, on a resistance roller seam welding machine.

18 Claims, 4 Drawing Sheets

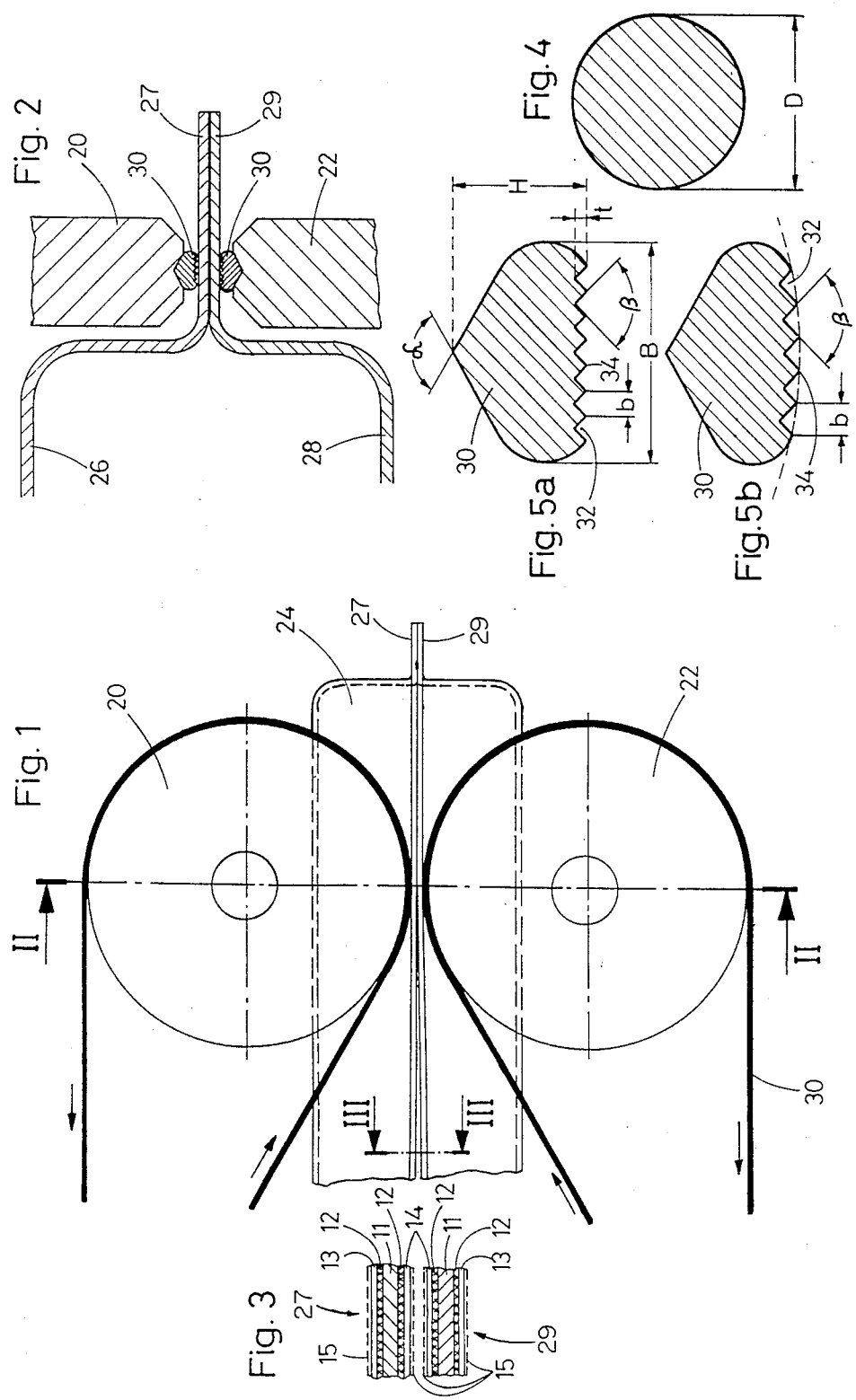

CONTACT WIRE FOR A ROLLER SEAM WELDING MACHINE

The invention relates to a contact wire for a roller seam welding machine, wherein, of the front adjacent to the work to be welded and back adjacent to the roller electrode, at least the front is provided with grooves.

Roller seam welding machines in which such a contact wire can be used are knonw (CH-A-No. 370 175 and DE-B-No. 1 565 803). It is a question of resistance roller seam welding machines wherein the contact wire, usually consisting of copper, prevents the roller electrodes, which usually likewise consist of copper, from being soiled by the sheet metal coated with tin, zinc, lead etc. Otherwise, during resistance welding of steel sheets provided with such metallic coatings, the roller electrodes would form alloys with the coating material of the work to be welded, under the action of the welding temperatures and the contact pressures, and would be contaminated as a result. As a result of this alloy formation, the welding parameters, particularly the characteristic values of the roller electrode material which influence the passage of current and the transfer of heat, would be altered and the formation of the weld structure would be impaired as a result. This problem is eliminated in that the contact wire, which is continuously freshly supplied to the welding position, is used between the work to be welded and the roller electrodes. The contact wire alloys with the coating metal of the sheet metal, which coating metal becomes molten shortly before or during the welding, and so prevents the coating metal released from alloying with the roller electrodes and making these useless. The wire contaminated by the welding operation is continuously conveyed away. The contact wire may either be taken in an endless loop and travel, after leaving the welding position, through a cleaning device so that it can be re-used, or it is unwound from a supply reel and wound up on a take-up reel after travelling through the welding position or again it is broken up in order to be melted down later. The contact wire may travel twice through the welding position so that once its front comes into contact with the work to be welded and once its back comes into contact with the work to be welded, at the welding position.

The contact wire which can be used in such roller seam welding machines usually has such a cross-section that the contact area between the contact wire and the roller electrode is greater than with a normal round wire, in order to achieve a better passage of current and less heating. For the resistance roller seam welding of steel sheets provided with a protective coating, such as tinned or galvanized sheets for example, a contact wire of the type mentioned at the beginning is known (CH-A-No. 595 177) which, in order to achieve a better passage of current and less heating, has a surface comprising raised portions and depressions alternating in the longitudinal direction of the wire, this wire surface having parallel grooving (that is to say parallel grooves transversely to the longitudinal direction of the wire) or cross grooving. The object of the grooving is to break up the oxide layer, always present on the contact wire, by deformation and to bring about local concentrations of welding current.

In the case of coated sheet metals wherein the coating does not consist of materials which are good electrical conductors such as tin, zinc, lead etc., but of materials which are poor electrical conductors or electrically non-conducting such as lacquer, lead oxide, wax or a heavy soiling having an insulating effect, no satisfactory welding results could be achieved in resistance roller seam welding with the known contact wire because the coating material (that is to say the material which is a poor electrical conductor or electrically non-conducting), which becomes semiplastic before the actual welding operation, would block up the grooves of the parallel grooving or the pores of the cross grooving and prevent the penetration of the edges of the grooving into the coating material to break through it. It is true that some semi-plastic or vaporized coating material is likely to be removed to a limited extent in the outer region of the grooves of the parallel grooving but not in the inner region. The removal of such material from the pores of the cross grooving is quite impossible. The contact wire therefore floats on the surface as a result of which, much too great a contact resistance remains effective between contact wire and sheet metal and so much too strong a current flows externally before the coating which is a poor conductor or non-conducting is punctured, so that the contact wire may burn. Fundamentally, in a resistance roller seam welding machine, there are three resistances in series between the two roller electrodes at the welding position, namely the two contact resistances between the contact wire and the sheet metal (or its coating) above and below the actual welding position respectively, and the transfer resistance between the two sheets to be welded at the actual welding position. The contact resistance should be as little as possible in each case, in order to prevent the burning of the contact wire and of the coating at the outsides of the sheet metal and to restrict the heating of the sheet metal during the welding largely to the actual welding position between the sheets. It is obvious that this requirement cannot be met if the contact wire floats on the coating.

Sheets provided with such coatings are at present becoming increasingly important in the manufacture of fuel tanks in the motor car industry and in the industrial production of sheet-metal frames which have to have an extremely impervious and determinate welded seam. For reasons of protection from corrosion, such sheets are coated at both sides with multi-layer insulating layers. For the manufacture of fuel tanks, such sheets have a coating of lead and zinc-dust enamel at the outside and a coating of lead and aluminium-dust enamel at the inside and possibly, in addition, a layer of wax at the inside and at the outside. When a fuel tank is produced from such coated sheet metal, two sheet-metal flanges overlapping one another at the outer circumference of the tank, in the central plane of the tank, are usually welded to one another. During the welding, therefore, at the one side of the welding position, that is to say towards the tank, there is a satisfactory removal of heat whereas at the other side, towards the edge, a build-up of heat occurs. If too short a distance between the edges is selected in resistance roller seam welding, the margin situated outside the seam is heated to a greater extent than the region situated inside the seam, because of the build-up of heat forming. This causes the contact wire to sink in deeper towards the outside and hence an increase in the transversely directed components of force. As a result of the slight lateral rigidity of the narrow marginal strip, the welded seam is inadequately supported so that the seam runs off in the direction of the edge and indentations occur in the sheet metal. This disadvantage cannot be avoided by the known contact wire because the grooves extending transversely to the longitudinal direction of the wire cannot guide the wire in the transverse direction at the welding position and because, during the welding of coated sheets of the said type, the floating of the contact wire would in any case prevent such guiding.

Apart from the known contact wire described above, which is flat at the front and at the back and is provided with parallel grooving or cross grooving, in known resistance roller seam welding machines, a so-called trielliptic contact wire is used which is V-shaped in cross-section at the back and rounded at the front and has no grooving. The trielliptic contact wire likewise leads to transverse thrust on the seam and there is the risk of the formation of longitudinal cracks at the surface of the seam. During the welding close to the edge of the sheet, this contact wire sinks deeper into the sheet metal because of the greater heating as a result of the build-up of heat at the side of the welding position adjacent to the edge of the sheet, and the transverse thrust is further intensified as a result of this. As a result of the very great and uneven contact resistance between contact wire and sheet metal, current intensities result which may lead to rupture of the sheet metal.

It is the object of the invention to improve a contact wire of the type mentioned at the beginning so that during the welding of sheets, particularly sheets with coatings which are poor electrical conductors or are electrically non-conducting or with severe soiling, the drift of the seam is prevented and a considerably better passage of current is achieved.

According to the invention, this problem is solved in that the grooves at the front are formed in the longitudinal direction of the wire.

Because of the longitudinal grooves, the contact wire according to the invention comprises a plurality of cutting edges or "knives" which are situated side by side and which, during the welding operation, cut open the sheets to be welded or their oxide layer or insulating coating, in the welding direction and render possible a direct passage of current to the sheet metal itself. The roller seam welding machine works without spatter formation and as a result of the very low and uniform contact resistance between contact wire and sheet metal, only current intensities at which burning through of the contact wire and the metal sheets is impossible result, and the inflow of current is regular and ensures a very regular welding. The cutting edges of the longitudinal grooves cut into the coating of the metal sheets and so form the contact needed for the beginning of the current conduction. In the case of metal sheets coated with coats of paint (for example zinc-dust or aluminium-dust enamel), this process is encouraged by the fact that the coat of paint is softened by the approach of the heat. This softening can, of course, be intensified or facilitated by additional means, such as preceding welding torches (autogenous or plasma) for example, but experiments have shown that when the contact wire according to the invention is used, preheating of the sheets is not necessary. The longitudinal channels formed on the surface of the contact wire by the longitudinal profiling facilitate the removal of semi-plastic or vaporized coating materials as a result of which the contact wire is reliably prevented from floating. The longitudinal edges continuously cutting into the coating and the sheet metal in the direction of movement of the wire not only cause the lower contact resistance and therefore the considerably improved passage of current but also a considerably improved guiding of the contact wire on the sheet metal as a result of which the seam is prevented from running off. As a result, not only is there a very uniform flow of the current and a neater surface of the seam but also it is possible to weld at a shorter distance from the edge of the sheet metal which is important during the manufacture of fuel tanks because these can be provided with narrower sheet-metal flanges.

In the development of the invention, the front and the back are provided with grooves formed in the longitudinal direction of the wire which makes it possible for the contact wire to travel through twice, at the top and bottom of the welding position.

In the development of the invention, the front of the contact wire is substantially flat, rounded or V-shaped in cross-section, and in the last case the vertex of the V-shape is preferably rounded. With all three cross-sectional shapes, lap seams or mash seams can be welded with satisfactory results on sheets which are severely soiled and/or have coatings which are poor electrical conductors or are electrically non-conducting, the best results having been achieved with the longitudinally grooved contact wire, the front of which is flat in cross-section.

The same applies to the contact wire in the development of the invention because in this case, during the second run through of the contact wire, its back is brought into contact with the welding position.

In the development of the invention, a preferred vertex angle of the V-shaped cross-section is about 120°.

Depending on the coating of the sheets to be cut through, the longitudinal edges between the longitudinal grooves may, indeed, be more or less sharp, but sharp longitudinal edges in accordance with the development of the invention according to Claim 6 produce the lower contact resistance aimed at with greater certainty and hence a uniform flow of current and the satisfactory guiding of the contact wire aimed at, which prevents the risk of the seam running off.

In the development of the invention, the groove width is 0.3 to 0.4 mm, in the case of contact wire of copper with a total cross-sectional width of about 2.7 mm.

The vertex angle of 90° of the longitudinal grooves which are V-shaped in cross-section according to the development of the invention ensures, in conjunction with a groove depth of 0.15 to 0.2 mm, a particularly satisfactory removal of semi-plastic and vaporized coating material and dirt from the welding position, forwards in the longitudinal grooves during the welding operation.

The use of the contact wire according to the invention is particularly advantageous in a roller seam welding machine for welding sheet metal, particularly for fuel tanks, which has coatings which are poor electrical conductors or electrically non-conducting, on both sides.

Examples of embodiment of the invention are described in more detail below with reference to the drawings.

Figure 6B:
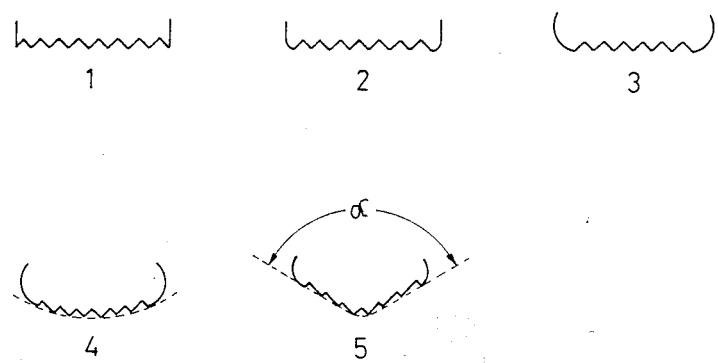
Figure 7A:
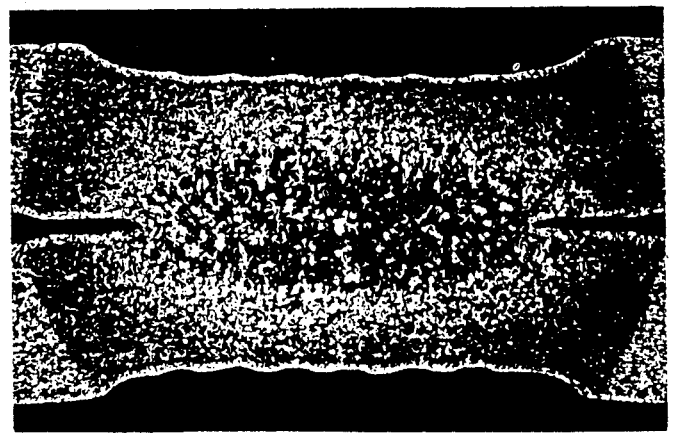
Figure 7B:
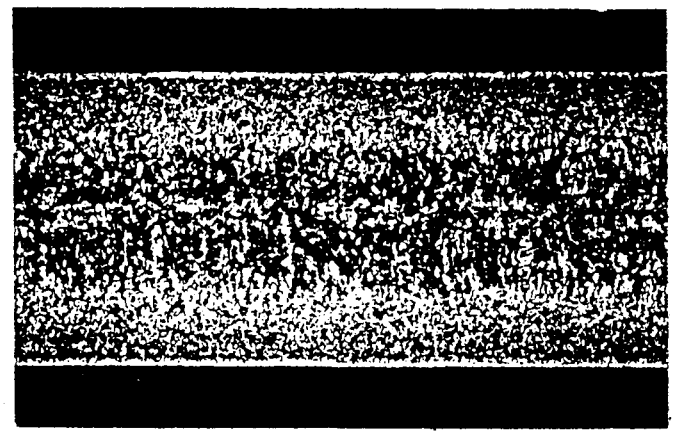
Figure 8A:
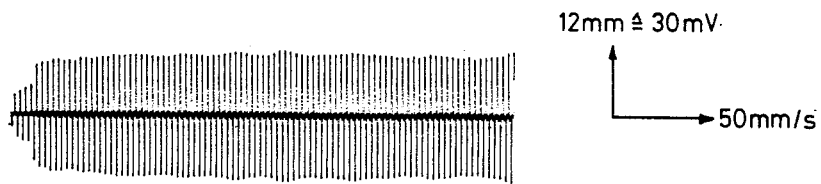
Figure 8B:
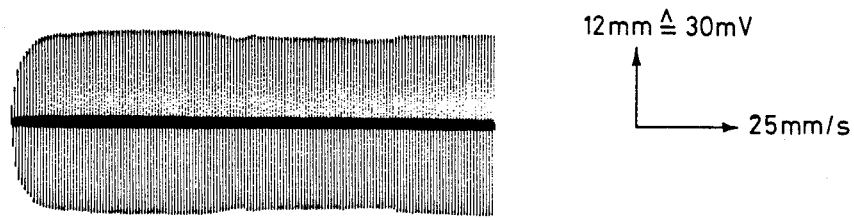
Figure 8C:
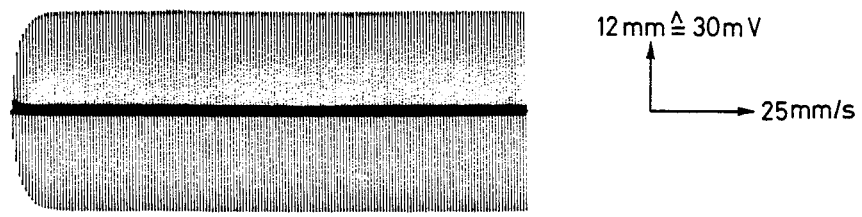

FIG. 1 shows, as part of a roller seam welding machine, the electrode rollers with the contact wire according to the invention during the welding of a fuel tank, FIG. 2 shows a cross-sectional view on the line II—II in FIG. 1, FIG. 3 shows a cross-sectional view on the line III—III in FIG. 1, FIG. 4 shows, in cross-section, a wire, for example of Cu, which forms the starting material for the production of the contact wire according to the invention, FIGS. 5a and 5b show preferred cross-sectional shapes of the contact wire according to the invention, FIGS. 6a and 6b show shapes which can be used for the front and back respectively of the contact wire according to the invention, FIGS. 7a and 7b show a cross-sectional view and a longitudinal-section view of a weld produced with the contact wire according to the invention as shown in FIG. 5a, FIGS. 8a–8c show oscillograms of the flow of welding current when using a trielliptic contact wire without longitudinal grooves (FIGS. 8a), a trielliptic contact wire without longitudinal grooves but with preheating of the seam by means of welding torches (FIG. 8b) and a trielliptic contact wire according to the invention, that is to say with longitudinal grooves but without preheating of the welding seam (FIG. 8c).

FIG. 1 shows a part of a known resistance roller seam welding machine (CH-A-No. 370175 or DE-B-No. 1 565 803), of which only an upper roller electrode 20 and a lower roller electrode 22 are illustrated. In the example illustrated, a fuel tank 24 is being welded from sheets 26, 28 which have the contruction described in more detail below with reference to FIG. 3. Drawn between each of the roller electrodes 20, 22 and the work to be welded is a contact wire 30 which serves the purpose described in more detail at the beginning. It may be a question of the same contact wire 30 at both roller electrodes 20, 22, the wire being brought into contact with the work to be welded at its front and at its back respectively, in two runs through, or of two contact wires, one of which is fed to the upper roller electrode 20 and the other to the lower roller electrode 22. The direction of travel of the contact wire is indicated by arrows. The roller electrodes 20, 22 are provided, at their peripheral surface, with a profile which is complementary to the back of the contact wire used, as shown in FIG. 2. Formed on the sheets 26, 28 are flanges 27, 29 which are welded to one another between the roller electrodes 20, 22.

FIG. 3 shows the construction of the sheets 26, 28 in cross-section on the line III—III in FIG. 1. The actual sheet 11 is steel sheet with a thickness of about 0.6 to 1.2 mm. Each sheet is provided with a coating on the inside and on the outside. At the outside, each coating consists of a covering 12 of lead which carries a coat of paint 13 of zinc-dust enamel. At the inside, each coating consists of a covering 12 of lead which carries a cost of paint 14 of aluminium-dust enamel. In the example of embodiment illustrated in FIG. 3, the coatings additionally have a covering 15 of wax on each surface.

FIG. 4 shows a cross-sectional view of a round copper wire with a diameter D of 2.2 mm, from which the contact wire 30 has been produced which preferably has the cross-sectional shape illustrated in FIG. 5a. According to FIG. 5a, it is a question of a wire which is substantially triangular in cross-section and which is substantially flat in cross-section at its front adjacent to the work to be welded and substantially V-shaped in cross-section at its back adjacent to the electrode roller 20 or 22, the vertex angle α of the V-shaped cross-section being 120° in the example of embodiment illustrated. The contact wire 30 illustrated in FIG. 5a is intended for a single run through between a roller electrode and the work to be welded. On its flat front, the contact wire 30 is provided with longitudinal grooves 32. The longitudinal grooves 32 are V-shaped in cross-section, the vertex angle β being 90° in the example of embodiment illustrated. Instead of this, the longitudinal grooves may also have a rectangular, semicircular, trapezoidal or other shape in cross-section. More important than the specific cross-sectional shape of the longitudinal grooves 32 are the edges 34 which are formed between the longitudinal grooves and the purpose of which is to cut through the coatings 12, 13 and 15, which are electrically insulating or poor electrical conductors (the lead covering usually carries a layer of lead oxide) and render possible a direct passage of the current from the roller electrode to the sheet metal 11. The longitudinal edges between the longitudinal grooves 32 may be more or less sharp depending on the coatings to be cut through but in any case particularly satisfactory results are achieved with the sharp longitudinal edges 34 shown in FIG. 5a. As a result of the fact that the longitudinal grooves 32 extend in the direction of movement of the contact wire 30, a continuous, regular passage of current is ensured because the same longitudinal edge 34 always cuts continuously through the coating into the sheet metal and the risk of the contact wire floating is avoided because direct, semi-plastic and vaporized coating material is continually carried away forwards out of the longitudinal grooves 32.

The trielliptic wire shown in FIG. 5b differs from the contact wire 30 shown in FIG. 5a only in that its front is rounded and that the longitudinal grooves 32 have a somewhat greater width b. In the example of embodiment shown in FIG. 5a, the groove width b is 0.3 mm and in the example of embodiment shown in FIG. 5b it is 0.4 mm. The cross-sectional height H is about 1.6 mm in both cases and the cross-sectional width B is about 2.7 mm. The groove depth t is about 0.15 mm in both cases. The longitudinal grooves 32 and therefore the longitudinal edges 34 extend parallel to the longitudinal direction of the wire, over its whole length.

FIGS. 6a and 6b show diagrammatic partial cross-sectional views of the back and front respectively of contact wire which can be used in the invention. The external contour of the back is illustrated in full lines in FIG. 6a whereas the longitudinal grooves 32 which are selectively present or not present at the back of the contact wire are indicated by broken lines. Corresponding to the cross-sectional shapes 1–5 of the back shown in FIG. 6a are the cross-sectional shapes 1–5 of the front shown in FIG. 6b. The cross-sectional shape 1 is a rectangle with sharp edges, the cross-sectional shape 2 a rectangle with rounded edges, the cross-sectional shape 3 consists of a flat surface with rounded lateral flanks, the cross-sectional shape 4 is rounded and the cross-sectional shape 5 is V-shaped, the vertex angle α of the V-shape being 120°. The cross-sectional shapes 1–5 are suitable both for the front and for the back, thus they are suitable for contact wire which is to be used at both sides. Because of the non-rounded vertex of the V-shape, the cross-sectional shapes 6 and 7 are only suitable for the back of the contact wire and lead to a particularly satisfactory guiding thereof in the roller electrode 20 or 22. In the cross-sectional shapes 6 and 7, the vertex angle α is 90° and 120° respectively. The cross-sectional shape 7 of the back together with the cross-sectional shapes 3 and 4 shown in FIG. 6b results in the preferred cross-sectional shapes which are shown in FIG. 5a and FIG. 5b respectively.

FIGS. 7a and 7b show, in cross-section and in longitudinal section respectively, a welding result which has been achieved with the contact wire 30 according to the invention. The coatings of the sheets have the construction shown in FIG. 3 (including the wax coverings 15). The contact wire 30 used during the welding had the cross-sectional shape shown in FIG. 5a. The welding data were: Rate of feed $V_s$=4.8 m/min; welding pressure $F_{EI}$=400 daN; transformer stage: 6; phase control: 65%.

FIGS. 7a, 7b show a seam free of cracks. During the welding experiments, no running off of the seam was observed if minimum distances from the edges of 8 to 12 mm were adhered to.

FIGS. 8a-8c show the results of comparative experiments which, as in the case described with reference to FIGS. 7a and 7b, were carried out on a single-phase alternating-current roller seam welding machine, but in the cases shown in FIGS. 8a-8c, sheets with the construction illustrated in FIG. 3 were welded but without the wax coverings 15. In the case of FIGS. 8a-8c, a trielliptic contact wire of the type shown in FIG. 5b was used in each case and, in the case of FIGS. 8a and 8b did not have any longitudinal grooves and in the case of FIG. 8c had the cross-sectional shape shown in FIG. 5b with the longitudinal grooves 32.

The welding current oscillogram in FIG. 8a shows
 a low welding current (but which nevertheless resulted in the development of great heat between sheet metal and contact wire because of high contact resistance),
 a nervous, irregular flow of current; and
 a slightly delayed ignition.
The weld showed an overheated surface to the seam and there was the risk of the contact wire breaking.

In the case of FIG. 8b, the same experiment was carried out with the same contact wire but the seam was preheated by means of two welding torches. The welding result was characterised by
 smooth course of the welding, no spatter formation;
 welding current fluctuating;
 smooth surface to the seam;
 no overheating of the contact wire; and
 welding current greatly increased in comparison with welding without preheating, because of lower contact resistance.

The experiment with reference to FIG. 8c was carried out with grooved trielliptic contact wire and without preheating of the welding seam. The welding result is characterised by:
 large welding current (because of considerably lower contact resistance);
 very smooth, uniform flow of current (ignition somewhat delayed in comparison with FIG. 8b but without any effect on the weld quality);
 nice seam surface, no spatter.

The important thing seen from the current diagram in FIG. 8c is the uniform flow of current which produces a correspondingly neat surface to the seam. The welding result shows that when grooved contact wire according to the invention is used, no preheating of the sheets is necessary.

A comparison of the current diagrams in FIGS. 8a and 8b shows that even when welding torches are used for the preheating, a welding current results which fluctuates to a relatively great extent.

What is claimed is:

1. A contact wire having a front and back for a roller seam welding machine, wherein said front is adjacent to a work to be welded and said back is adjacent to a roller electrode, at least the front is characterized by grooves (32) extending parallel to a longitudinal direction of movement of the wire.

2. The contact wire as claimed in claim 1, characterized in that the front and the back are provided with grooves (32) formed in the longitudinal direction of the wire.

3. The contact wire as claimed in claim 2 characterized in that the back is substantially flat.

4. The contact wire as claimed in claim 2 characterized in that the back is substantially rounded.

5. The contact wire as claimed in claim 2 characterized in that the back is substantially V-shaped in cross-section.

6. The contact wire as claimed in claim 2 characterized in that the front is substantially flat.

7. The contact wire as claimed in claim 2 characterized in that the front is substantially rounded.

8. The contact wire as claimed in claim 2 characterized in that the front is substantially V-shaped in cross-section.

9. The contact wire as claimed in claim 1 characterized in that the front is substantially flat.

10. The contact wire as claimed in claim 1, characterized in that the back is substantially flat.

11. The contact wire as claimed in claim 1, characterized in that the longitudinal grooves (32) are bounded by sharp longitudinal edges (34).

12. Contact wire as claimed in claim 1 characterized in that the groove width (b), measured transversely to the longitudinal direction of the wire between adjacent longitudinal edges (34) is 0.3 to 0.4 mm.

13. Contact wire as claimed in claim 1 characterized in that the longitudinal grooves (32) are V-shaped in cross-section and have a vertex angle ($\beta$) of 90° and a depth (t) of 0.15–0.2 mm.

14. The contact wire as claimed in claim 1 characterized in that the back is substantially V-shaped in cross-section.

15. The contact wire as claimed in claim 14, characterized in that a vertex angle ($\alpha$) of the V-shaped cross-section is 120°.

16. The contact wire as claimed in claim 1 characterized in that the front is substantially rounded.

17. The contact wire as claimed in claim 1 characterized in that the front is substantially V-shaped in cross-section.

18. The contact wire as claimed in claim 1 characterized in that the back is substantially rounded.

* * * * *